United States Patent
Shibata

(10) Patent No.: US 8,599,145 B2
(45) Date of Patent: Dec. 3, 2013

(54) OPERATION SYSTEM WITH RIGHT SEAT OR LEFT SEAT OPERATOR DETERMINATION

(75) Inventor: Shinji Shibata, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 1146 days.

(21) Appl. No.: 11/979,632

(22) Filed: Nov. 6, 2007

(65) Prior Publication Data

US 2008/0106515 A1    May 8, 2008

(30) Foreign Application Priority Data

Nov. 8, 2006   (JP) .................................. 2006-303106

(51) Int. Cl.
*G06F 3/033* (2013.01)

(52) U.S. Cl.
USPC ........................................................ 345/173

(58) Field of Classification Search
USPC .................................. 345/173–184
See application file for complete search history.

(56) References Cited

U.S. PATENT DOCUMENTS

| | | | | |
|---|---|---|---|---|
| 5,841,425 A * | 11/1998 | Zenz, Sr. | ...................... | 345/163 |
| 5,956,019 A * | 9/1999 | Bang et al. | .................... | 345/173 |
| 2002/0105495 A1* | 8/2002 | Numata et al. | ................ | 345/156 |
| 2002/0113779 A1* | 8/2002 | Itoh et al. | ...................... | 345/173 |
| 2003/0234764 A1* | 12/2003 | Noguchi et al. | .............. | 345/156 |
| 2007/0297064 A1 | 12/2007 | Watanabe et al. | | |
| 2008/0068284 A1* | 3/2008 | Watanabe et al. | ............. | 345/1.1 |

FOREIGN PATENT DOCUMENTS

| | | |
|---|---|---|
| JP | A-10-260784 | 9/1998 |
| JP | A-2000-149719 | 5/2000 |
| JP | A-2004-233816 | 8/2004 |
| JP | A-2005-096515 | 4/2005 |
| JP | A-2005-138624 | 6/2005 |
| JP | A-2005-284592 | 10/2005 |
| JP | A-2006-151364 | 6/2006 |
| WO | WO 2006046783 A1 * | 5/2006 ............. G06F 3/041 |

OTHER PUBLICATIONS

Office Action mailed Jul. 5, 2011 in corresponding JP patent application No. 2006-303106 (English translation enclosed).

* cited by examiner

*Primary Examiner* — Chanh Nguyen
*Assistant Examiner* — Sanghyuk Park
(74) *Attorney, Agent, or Firm* — Posz Law Group, PLC

(57) ABSTRACT

A manually operated operation apparatus that is combined with a display apparatus for showing a different image for respectively different occupants includes a driver sensor at a position being touched by a driver who operates an operation unit, a passenger sensor at another position being touched by a passenger who operates the operation unit. Based on a detection result of these sensors, the operator of the operation unit is determined. In this manner, the operation apparatus distinguishes the operator of the operation unit for removing a limitation on an operation icon being displayed on the display apparatus without imposing a special operation on a user, thereby enabling an improvement of the usability of the operation apparatus.

10 Claims, 3 Drawing Sheets

OPERATION SYSTEM WITH RIGHT SEAT OR LEFT SEAT OPERATOR DETERMINATION

CROSS REFERENCE TO RELATED APPLICATION

This application is based on and claims the benefit of priority of Japanese Patent Application No. 2006-303106 filed on Nov. 8, 2006, the disclosure of which is incorporated herein by reference.

FIELD OF THE DISCLOSURE

The present disclosure generally relates to an operation apparatus for use in a vehicle in combination with a dual view display apparatus.

BACKGROUND INFORMATION

In recent years, a display apparatus called "Dual View Display" is known for use in a vehicle. The Dual View type display apparatus displays two different images on one screen to be viewed simultaneously from two different viewing directions.

When the Dual View type display apparatus is used in a navigation apparatus, it is convenient for the occupants in both of the driver's seat and the passenger's seat because respective occupants see a different image that serves their respective purposes appropriately. However, when the occupants in the driver's seat and in the passenger's seat are viewing respectively different images, whether an operation instruction is inputted in association with the content of the image by the driver or by the passenger has to be distinguished by the navigation apparatus. In this case, if two operation unit are separately disposed for the driver's seat and for the passenger's seat, the origin of the operation instruction can be easily distinguished. That is, the operation instruction inputted from the operation unit on the driver's seat side is determined as the instruction from the driver, and the operation instruction inputted from the operation unit on the passenger's seat side is determined as the instruction from the passenger. However, the restriction on the space or position for installing the operation unit in the vehicle makes it difficult to have separate operation units for both of the driver's seat and the passenger's seat.

Therefore, an idea of single operation unit that can be used by both of the driver and the passenger is in consideration. In that case, an instruction inputted from the single operation unit has to be attributed to one of the two operators, that is, to the driver or to the passenger by some means.

For example, a technique disclosed in Japanese patent document JP-A-2005-284592 uses two operation icons respectively for a viewer A and for a viewer B in a dual view display apparatus having a touch panel. The two operation icons are displayed in a non-superposing manner with each other for distinguishing an operation on the touch panel either by the driver or the passenger.

However, the technique described above has a restriction on the number of the operation icons on the screen as well as a restriction on an arrangement of the operation icons on the screen. Therefore, the usability of the display apparatus using the above technique is deteriorated in comparison to the normal display apparatus having only one image on the screen.

SUMMARY OF THE DISCLOSURE

In view of the above and other problems, the present disclosure provides an operation apparatus that is used in combination with a dual view display apparatus for displaying two different images for respective users, and provides a "user distinguishability" for distinguishing respective users without compromising usability.

The operation apparatus includes an operation unit, an operation detection unit, a first/second sensor and a control unit in combination with a display apparatus that simultaneously displays two different images for viewing from two different viewing directions.

The operation unit for a manual operation is installed between two seats that are disposed facing in the same direction, and is controlled manually by occupants of the two seats, that are, an occupant in the left seat and an occupant in the right seat. The operation detection unit detects the content of the manual operation performed on the operation unit, and the first sensor is disposed at a first position that is touched by the left hand of the occupant in the right seat in the course of the manual operation without being touched by the right hand of the occupant in the left seat, and the second sensor is disposed at a second position that is touched by the right hand of the occupant in the left seat in the course of the manual operation without being touched by the left hand of the occupant in the right seat.

The control unit outputs to a predetermined device the content of the manual operation detected by the operation detection unit as an instruction from the occupant in the right seat when the first sensor has detected a touch, and also outputs to a predetermined device the content of the manual operation detected by the operation detection unit as an instruction from the occupant in the left seat when the second sensor has detected a touch. In this case, the predetermined device is, for example, a navigation apparatus, an audio apparatus, an air-conditioning apparatus or the like, and the device includes a display unit for displaying control information of the subject apparatus.

The operation unit is touched at different positions when the unit is operated manually by the left hand and by the right hand, due to an asymmetrical shape of the hand. More practically, there are positions only touched by the left hand in the course of the manual operation of the operation unit by the left hand, and there also are the positions only touched by the right hand in the course of the manual operation of the operation unit by the right hand. The inventor of the present invention arranged the first sensor at the position that is touched only by the left hand for an operation of the operation unit, and arranged the second sensor at the position that is touched only by the right hand for an operation of the operation unit based on the finding of those positions. As a result, the operation of the operation unit can be determined as either of the operation by the right hand or the left hand, and usability such as an arrangement of operation icons on the display unit is not restricted. That is, the usability of the operation apparatus is not compromised due to the improvement regarding the determination function for determining the operator of the operation unit.

The first position may preferably be susceptible to the touch by a left thumb of the occupant in the right seat (i.e., a thumb of a driver when the vehicle is adapted to the left-hand traffic) without being susceptible to the touch by a right thumb of the occupant in the left seat (i.e., a thumb of a passenger), and the second position may preferably be susceptible to the touch by a right thumb of the occupant in the left seat without being susceptible to the touch by a left thumb of the occupant in the right seat.

BRIEF DESCRIPTION OF THE DRAWINGS

Other objects, features and advantages of the present invention will become more apparent from the following detailed description made with reference to the accompanying drawings, in which.

DETAILED DESCRIPTION

An embodiment of the present invention is described with reference to the drawings. The embodiment of the present invention is not limited to the following descriptions, but is in various forms as long as they pertain to the scope of the invention.

Figure 1:
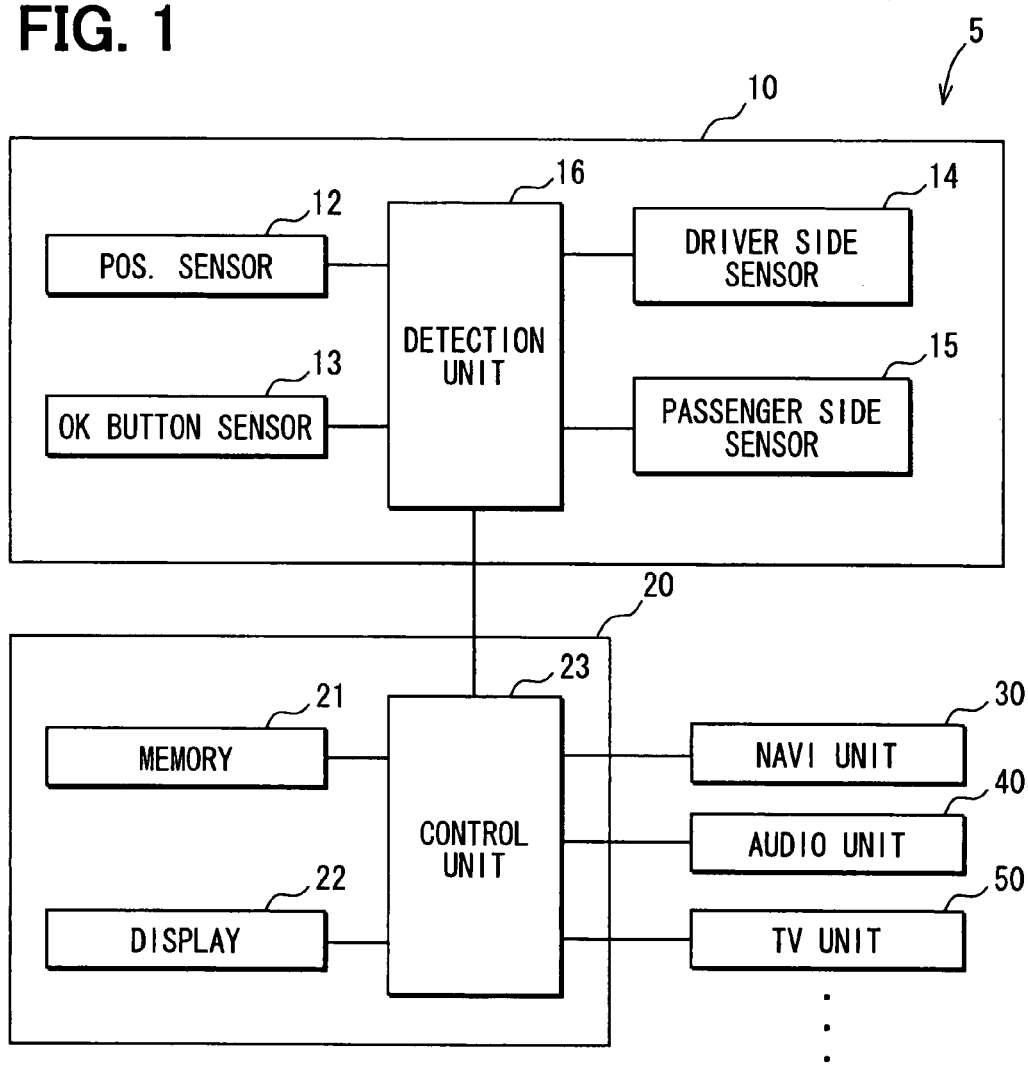
FIG. 1 shows a block diagram of a vehicle operation system in an embodiment of the present disclosure.

FIG. 1 is a block diagram showing an outline configuration of an operation system 5 for use in a vehicle in the present embodiment. The operation system 5 includes an operation unit 10 and a display unit 20 and a the navigation unit 30 and an the audio unit 40 and a television (TV) unit 50.

The operation unit 10 includes a position sensor 12, an OK button sensor 13, a driver side sensor 14, a passenger side sensor 15 and a detection unit 16 with each of those sensors being connected to the detection unit 16.

The operation unit 10 is disposed at a position in the vehicle between a right front seat and a left front seat for both of an operator (i.e., may also be referred to as a "driver" hereinafter) in the right front seat who reaches out the left hand to the operation unit 10 in a conventional right side steering wheel vehicle and, at the same time, for an operator (i.e., may also be referred to as a "passenger" hereinafter) in the left seat who reaches out the right hand to the operation unit 10. In this case, the above positional relationships (i.e., the left-right relationship) may be reversed for a left side steering wheel vehicle.

Figure 2A:
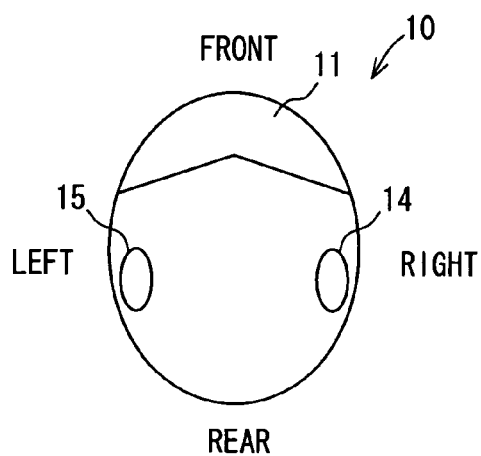
FIGS. 2A and 2B show illustrations of an operation unit in the embodiment of the present disclosure.
Figure 2B:
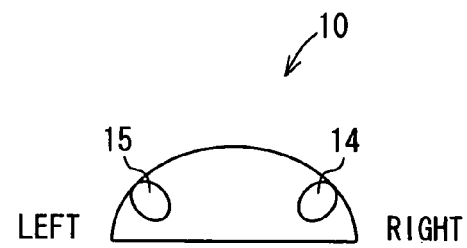

The shape of the operation unit 10 is explained with an illustration in FIGS. 2A and 2B next. FIG. 2A is a top view of the operation unit 10 in the vehicle, that is, the shape of the operation unit 10 being viewed from above. FIG. 2B is a side view of the operation unit 10 being viewed from a rear side of the vehicle.

The operation unit 10 is in a shape that is substantially hemispherical to be grasped by the driver or the passenger, with its sectional plane being positioned in parallel with a bottom surface of the vehicle, or with its convex side protruding toward an inside of the vehicle. In addition, the operation unit 10 is movable in parallel with the bottom surface of the vehicle under an operational control by the driver or the passenger. Further, the operation unit 10 is biased to return to an initial position by, for example, a spring or the like, and thus the operation unit 10 returns to its initial position when the driver/passenger releases his/her hand therefrom.

Furthermore, an OK button 11 is disposed on a front side of the operation unit 10 (i.e., a front side of the vehicle), and the OK button 11 can be pressed down when the driver/passenger grasps the operation unit 10. Furthermore, the driver side sensor 14 is disposed on the right side of the operation unit 10 (i.e., the right side of the vehicle), and is positioned to be touched by a left thumb of the driver when the driver grasps the operation unit 10. In this case, the driver side sensor 14 is not touched by the passenger's hand when the passenger grasps the operation unit 10.

The OK button 11 may be considered as manual operation unit, and may preferably be disposed at a position that can be easily operated by a finger of the left hand of the driver except for the left thumb, or a finger of the right hand of the passenger except for the right thumb.

Furthermore, the passenger side sensor 15 is disposed on the left side of the operation unit 10 (i.e., the left side of the vehicle), and is positioned to be touched by a right thumb of the passenger when the passenger grasps the operation unit 10. In this case, the passenger side sensor 15 is not touched by the driver's hand when the driver grasps the operation unit 10.

The position sensor 12 in FIG. 1 is a sensor detecting a movement position of the operation unit 10. Therefore, a driver's operation condition or a passenger's operation condition of the operation unit 10 can be grasped by a detection result of the position sensor 12.

The driver side sensor 14 is a pressure detection sensor at the position that can be touched by the driver's hand when the driver holds the operation unit 10 as stated above. The passenger side sensor 15 is a pressure detection sensor disposed at a position to be touched by the passenger's hand when a passenger holds the operation unit 10 as stated above.

The detection unit 16 consists of a microcomputer and the like, and has a function for converting detection information from the position sensor 12, the OK button sensor 13, the driver side sensor 14, and the passenger side sensor 15 to digital data and for transmitting the digital data to the display unit 20.

On the other hand, the display unit 20 includes a memory 21, a display 22 and a control unit 23. The memory 21 consists of ROMs and RAMs. The ROM stores a program and control data. The RAM is used as a temporary data storage area for temporarily storing data at a time of program execution.

The display 22 is an image display panel which can simultaneously display two different images respectively for viewing from two different viewing directions. The viewing angles are defined relative to a surface of the display 22. The control unit 23 consists of a microcomputer or the like. The control unit 23 performs an operation determination process that is described later by executing a program stored in the memory 21. The control unit 23 also performs a function that displays on the display 22 image information that is inputted from a navigation unit 30, an audio unit 40, or a television unit 50. In this case, the control unit 23 uses a detection result of various sensors received from the operation unit 10 when performing the operation determination process.

The navigation unit 30 is a vehicular navigation unit of well-known type, and outputs map information to the display unit 20. The audio unit 46 is a vehicular audio unit of well-known type, and outputs to the display unit 20 required information that is necessary for adjustment of the audio unit such as volume adjustment, sound quality adjustment, music selection and the like.

The TV unit 50 is a TV unit of well-known type having a vehicular TV receiver circuit, and outputs to the display unit 20 received TV image information after de-modulation.

Figure 3:
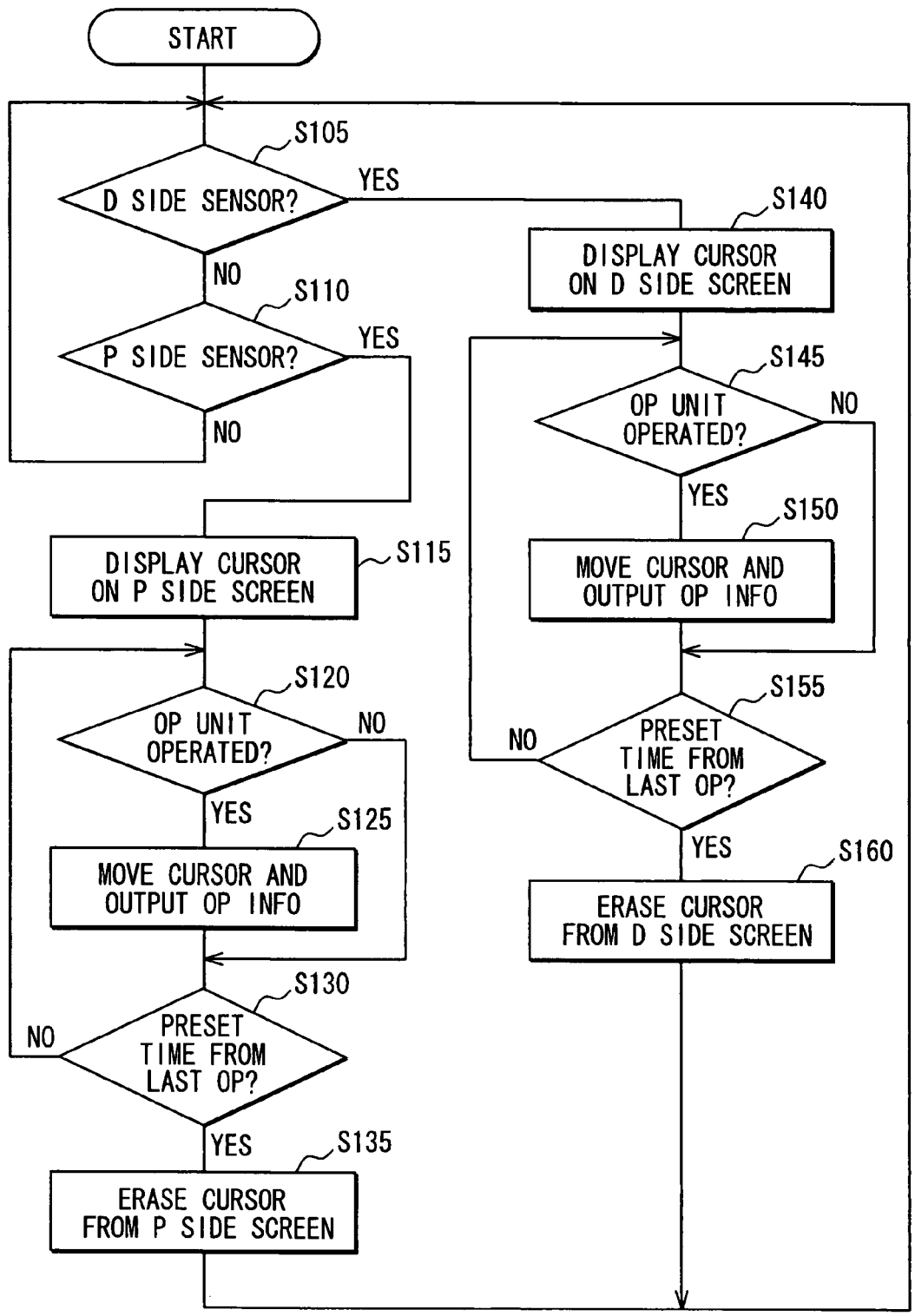
FIG. 3 shows a flowchart of an operation distribution process in the embodiment of the present disclosure.

The operation determination process which is performed by the control unit 23 of the display unit 20 is described with a flowchart in FIG. 3 next. In this case, as for the operation determination process, the process is started when a power supply to the display unit 20 is started.

The control unit 23 determines whether a contact of a hand has been detected by the driver side sensor 14 when the operation determination process is started (S105). When the driver side sensor 14 detects a contact pressure of a predetermined value or more in this determination step, it is assumed that "a contact of a hand has been detected." In this case, the contact pressure equal to or greater than a predetermined value is defined as a contact pressure that indicates an operational movement or an operation preparation movement of an operator. That is, the contact pressure has a pressure magnitude that can be assumed as a grasp of the operation unit 10 by the operator for operating the operation unit 10, and the pressure magnitude is in a different level from the one that indicates a mere contact of the hand. Further, in this case, a detection of the contact of the hand is equivalent to the grasp of the operation unit 10 by the driver. Furthermore, this determination step is carried out for a time that can be ignorable.

In S105, when it is determined that manual contact (i.e., the contact of the hand) has been detected by the driver side sensor 14 (S105: Yes), the process proceeds to S140. When the manual contact has not been detected by the driver side sensor 14 (S105: No), the process proceeds to S110.

In S110 that is reached after determining that the manual contact is not detected by the driver side sensor 14, whether the manual contact has been detected by the passenger side sensor 15 is determined. When the passenger side sensor 15 detects a contact pressure that is equal to or greater than a predetermined value in this determination step, it is assumed that "a contact of a hand has been detected." In this case, the contact pressure equal to or greater than a predetermined value is defined as a contact pressure that indicates an operational movement or an operation preparation movement of an operator. That is, the contact pressure has a pressure magnitude that can be assumed as a grasp of the operation unit 10 by the operator for operating the operation unit 10, and the pressure magnitude is in a different level from the one that indicates a mere contact of the hand. Further, in this case, a detection of the contact of the hand is equivalent to the grasp of the operation unit 10 by the driver. Furthermore, this determination step is carried out for a time that can be ignorable. In other words, the control unit 23 of the display unit 20 is configured to alternately determine whether the manual contact has been detected by the driver side sensor 14 or by the passenger side sensor 15 (S105, S110). Further, the process time for the determination can be ignorable. Therefore, the process can be described as that the control unit 23 of the display unit 20 is determining which side of the operation unit 10 (whether it is the passenger side or the driver side) is touched first by an operator.

When, in S110, it has been determined that the manual contact is detected by the passenger side sensor 15 (S110: Yes), the process proceeds to S115. When the manual contact has not been detected by the passenger side sensor 15 (S110: No), the process returns to S105.

Figure 4:
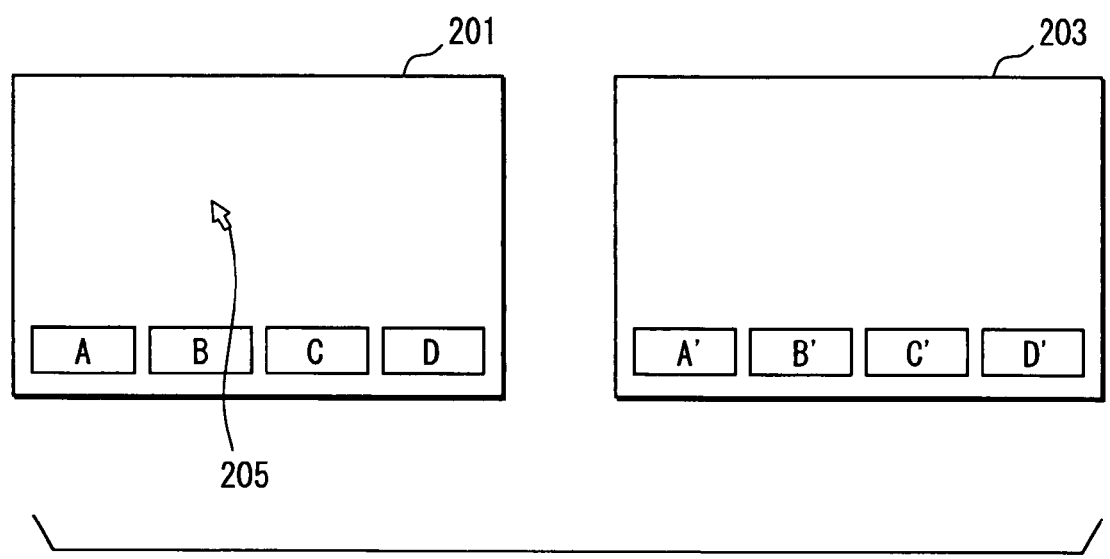
FIG. 4 shows an illustration of a cursor displayed on a screen in the embodiment of the present disclosure.

In S115 which is reached after a determination that the manual contact has been detected by the passenger side sensor 15, a cursor is displayed on a passenger side screen. The screen having the cursor is illustrated in FIG. 4.

A screen 201 is a screen viewed by a passenger. In the screen 201, operation icons A-D are displayed, and a cursor 205 is also displayed. On the other hand, a screen 203 is a screen viewed by a driver. In the screen 203, operation icons A'-D' are displayed, but the cursor is not displayed. In other words, the cursor 205 is displayed only on a screen that is viewed by the passenger. In addition, the operation icons A-D and the operation icon A'-D' are having equivalent positions on the screen of the display 22 in terms of screen constitution in the display 22.

Then, the control unit 23 in FIG. 3 determines whether the operation unit 10 has been operated (S120). In this determination step, the detection results from the position sensor 12 of the operation unit 10, the OK button sensor 13 and the passenger side sensor 15 are utilized. More practically, it is determined that "The operation unit 10 has been operated" when the position sensor 12 of the operation unit 10 has detected the movement of the operation unit 10, or it is determined that "The operation unit 10 has not been operated" when the position sensor 12 of the operation unit 10 has detected the movement of the operation unit 10. The detection results from the button sensor 13 and the passenger side sensor 15 are utilized in the same manner.

When, in S120, it has been determined that "The operation unit 10 has been operated" (S120: Yes), the process proceeds to S125. When it has been determined that "The operation unit 10 has not been operated" (S120: No), the process proceeds to S130.

In S125 which is reached after a determination that "The operation unit 10 has been operated," the cursor is moved based on operation information of the operation unit 10, and the operation information is output to an external unit (i.e., the navigation unit 30, the audio unit 40, and the TV unit 50). In this case, the "operation information" is information from the position sensor 12 or from the OK button sensor 13. Then, the control unit 23 advances the process to S130.

In S130, whether a predetermined time has elapsed after the last operation is determined. The time is determined based on the operation information stated above. In addition, the "predetermined time" means a period of time required for a series of operations by an operator, and may preferably be a time of, for example, 10 seconds, 30 seconds or the like.

When, in S130, it has been determined that the predetermined time has passed after the last operation (S130: Yes), the process proceeds to S135. When it is determined that the predetermined time has not passed after the last operation (S130: No), the process returns to S120.

In S135 which is reached when it has been determined that the predetermined time has passed after the last operation, the cursor is erased from the passenger side screen. Then, the process returns to S105. In S140 which is reached when it has been determined that the manual contact has been detected by the driver side sensor 14 in S105, the cursor is displayed on a driver side screen.

Then, the control unit 23 in FIG. 3 determines whether the operation unit 10 has been operated (S145). In this determination step, the detection results from the position sensor 12 of the operation unit 10, the OK button sensor 13 and the passenger side sensor 15 are utilized. More practically, it is determined that "The operation unit 10 has been operated" when the position sensor 12 of the operation unit 10 has detected the movement of the operation unit 10, or it is determined that "The operation unit 10 has not been operated" when the position sensor 12 of the operation unit 10 has detected the movement of the operation unit 10. The detection results from the button sensor 13 and the driver side sensor 14 are utilized in the same manner.

When, in S145, it has been determined that "The operation unit 10 has been operated" (S145: Yes), the process proceeds to S150. When it has been determined that "The operation unit 10 has not been operated" (S145: No), the process proceeds to S155.

In S150 which is reached after a determination that "The operation unit 10 has been operated," the cursor is moved based on the operation information of the operation unit 10, and the operation information is output to the external unit. In this case, the "operation information" is information from the position sensor 12 or from the OK button sensor 13. Then, the control unit 23 advances the process to S130.

In S155 which is reached after a determination that "The operation unit 10 has not been operated", whether a predetermined time has elapsed after the last operation is determined. When it has been determined that the predetermined time has passed after the last operation (S155: Yes), the process proceeds to S160. When it is determined that the predetermined time has not passed after the last operation (S155: No), the process returns to S145.

In S160 which is reached when it has been determined that the predetermined time has passed after the last operation, the cursor is erased from the driver side screen. Then, the process returns to S105.

An effect of the above embodiment is explained in the following. The operation system 5 of the above embodiment can determine who has operated the operation unit 10 by having the driver side sensor 14 and the passenger side sensor 15 at respectively different positions that are only touched either by the driver or the passenger. Therefore, being different from a conventional apparatus, the operation icons displayed on the display 22 are not restricted in terms of the arrangement of the display positions on the screen, thereby preventing deterioration of the usability.

In addition, the operation of the operation unit 10 is detected in greater accuracy by sensing the contact pressure of the operator's hand on the operation unit 10, thereby enabling an accurate detection of operation by, for example, ignoring an unintentional light touch.

In addition, based on an assumption that the operator touches the operator's side sensor first because the operator reaches out the operation unit 10 from his/her seat, the operator of the operation unit 10 is detected in yet greater accuracy.

In addition, the control unit 23 of the display unit 20 does not change the determined operator for a predetermined time, thereby improving the usability by allowing the operator not to consider a false touch on an opposite side sensor.

In addition, by displaying the cursor on the operator side screen, the cursor is used as a feedback indicator for notifying that the operation system 5 recognizes the driver/passenger as the operator, thereby providing a comfort for the operator.

In addition, the operation unit 10 is biased to return to the initial position by a reactive force, thereby enabling an accurate detection of the operator of the operation unit 10 due to a magnitude of the operation force to counter the reactive force.

Although the present invention has been fully described in connection with the preferred embodiment thereof with reference to the accompanying drawings, it is to be noted that various changes and modifications will become apparent to those skilled in the art.

For example, though the operation system 5 of the present embodiment is described for use in an automotive vehicle, it may also be used for controlling a display interface having its manual operation unit disposed between two seats facing in the same direction. That is, the system may be applied for use in a boat, an aircraft, a spacecraft or the like.

Such changes and modifications are to be understood as being within the scope of the present invention as defined by the appended claims.

What is claimed is:

1. An operation system comprising:
 a display unit for simultaneously showing on a single display screen a first screen image and a second screen image that are viewed from respectively different first and second directions, the first direction for viewing of the first screen image by a right seat operator in a right seat and the second direction for viewing of the second screen image by a left seat operator in a left seat; and
 a manual operation unit that is disposed between the right and left seats having a same seating orientation and is manually operated by one of a left hand of the right seat operator in the right seat and a right hand of the left seat operator in the left seat, wherein
 the manual operation unit includes
  a detection unit that detects a content of a manual operation performed on the manual operation unit;
  a first touch sensor that is disposed at a first position and that is susceptible to a touch of the left hand of the right seat operator without being susceptible to a touch of the right hand of the left seat operator while the right seat operator is operating the manual operation unit; and
  a second touch sensor that is disposed at a second position and that is susceptible to a touch of the right hand of the left seat operator without being susceptible to a touch of the left hand of the right seat operator while the left seat operator is operating the manual operation unit,
 the display unit includes
  a cursor image generation unit that generates a cursor image to represent a cursor; and
  a control unit that outputs to a predetermined external device the content of the manual operation on the manual operation unit,
 the control unit controls the cursor image generation unit to generate the cursor image at a position according to the content of the manual operation detected by the detection unit, superposes the cursor image on the first screen image, and outputs the content of the manual operation detected by the detection unit as the manual operation of the right seat operator when the first touch sensor detects a touch, and
 the control unit controls the cursor image generation unit to generate the cursor image at a position according to the content of the manual operation detected by the detection unit, superposed the cursor image on the second screen image, and outputs the content of the manual operation detected by the detection unit as the manual operation of the left seat operator when the second touch sensor detects the touch.

2. The operation system of claim 1, wherein
when the first touch sensor detects a pressure being equal to or more than a predetermined value, the indicator is output to the first screen image and the content of the manual operation detected by the detection unit is output to the predetermined external device as the manual operation performed by the right seat operator, and
when the second sensor detects a pressure being equal to or more than a predetermined value, the indicator is output to the second screen image and the content of the manual operation detected by the detection unit is output to the predetermined device as the manual operation performed by the left seat operator.

3. The operation system of claim 1, wherein
the first touch sensor is disposed on a right seat side relative to the manual operation unit, and
the second touch sensor is disposed on a left seat side relative to the manual operation unit.

4. The operation system of claim 1, wherein
the control unit outputs the content of the manual operation detected by the detection unit as the manual operation performed by a same operator regardless of a detection result of the first touch sensor and the second touch sensor for a predetermined period after a start of an output of the content of the manual operation detected by the detection unit as the manual operation of the operator in either of the right seat or the left seat to the predetermined external device.

5. The operation system of claim 1, wherein
the manual operation unit has an operation characteristic of returning to a predetermined position.

6. The operation system of claim 1, wherein
the first position is a position that is touched by a left thumb of the right seat operator with ease, and
the second position is a position that is touched by a right thumb of the left seat operator with ease.

7. The operation system of claim 1, wherein
the detection unit is disposed at a third position on the manual operation unit,
the third position is different from the first and the second positions on the manual operation unit,
the third position is operated with ease by one of a finger other than a left thumb of the right seat operator and a finger other than a right thumb of the left seat operator.

8. The operation system of claim 1, wherein
one of the first touch sensor and the second touch sensor detects whether a touch is from the left hand of the right seat operator or from the right hand driver of the left seat operator, respectively;
the control unit outputs an indicator in the first screen image when the first touch sensor detects the touch and outputs an indicator in the second screen image when the second touch sensor detects the touch;
the detection unit detects the content of the manual operation performed on the manual operation unit; and
based upon the content of the manual operation detected by the detection unit, the control unit
outputs the indictor as moving in the first screen image when the first touch sensor detects the touch is from the left hand of the right seat operator, and
outputs the indicator as moving in the second screen image when the second touch sensor detects the touch is from the right hand of the left seat operator.

9. The manually-operated operation apparatus of claim 1, wherein
the control unit erases the cursor image that is superposed on the first screen image or on the second screen image when it is determined that a predetermined time has passed after a last operation of the manual operation unit.

10. An operation system, comprising:
a display unit for simultaneously showing on a single display screen a first screen image and a second screen image that are viewed from respectively different first and second directions, the first direction for viewing of the first screen image by a right seat operator in a right seat and the second direction for viewing of the second screen image by a left seat operator in a left seat; and
a manual operation unit that is disposed between the right seat and the left seat respectively having a same seating orientation and is manually operated by one of a left hand of the right seat operator and a right hand of the left seat operator, wherein
the manual operation unit includes
a detection unit that detects a content of a manual operation performed on the manual operation unit;
a first touch sensor that is disposed at a first position and that is susceptible to a touch of the left hand of the right seat operator without being susceptible to a touch of the right hand of the left seat operator while the operator is operating the manual operation unit; and
a second touch sensor that is disposed at a second position and that is susceptible to a touch of the right hand of the left seat operator without being susceptible to a touch of the left hand of the right seat operator while the operator is operating the manual operation unit, and
the display unit includes a control unit that
determines that the right seat operator is operating the manual operation unit when the first touch sensor detects a touch, and
determines that the left seat operator is operating the manual operation unit when the second touch sensor detects a touch,
the control unit controlling an indicator in the first screen image according to the content of the manual operation detected as the manual operation of the right seat operator by the detection unit when the first touch sensor detects a touch, and
the control unit controlling an indicator in the second screen image according to the content of the manual operation detected as the manual operation of the left seat operator by the detection unit when the second touch sensor detects the touch.

\* \* \* \* \*